Dec. 22, 1970          W. M. HANLEY          3,550,001
TELEPRINTER EQUIPMENT MOUNTING ASSEMBLY
Filed Aug. 1, 1968          4 Sheets-Sheet 1
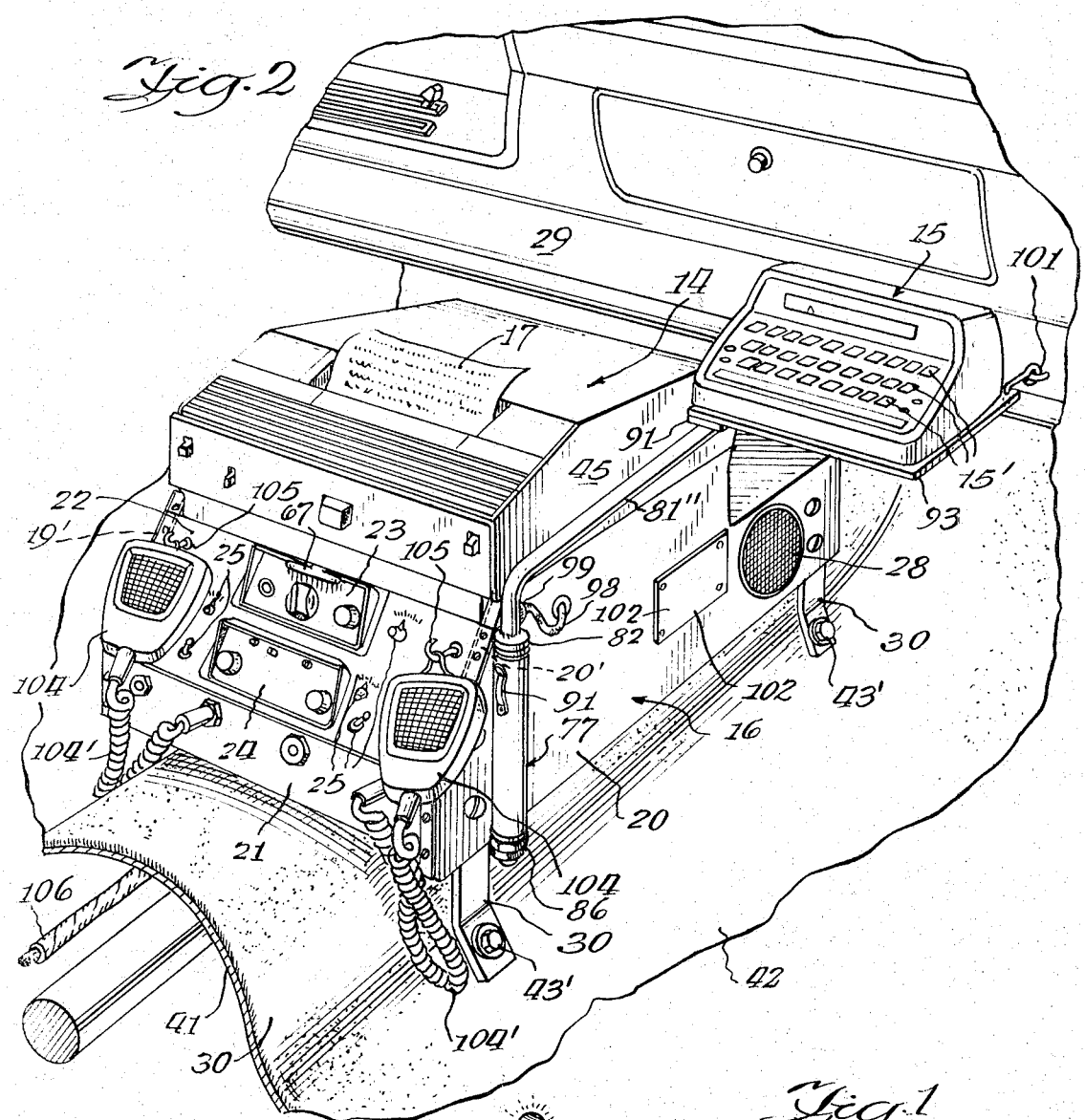
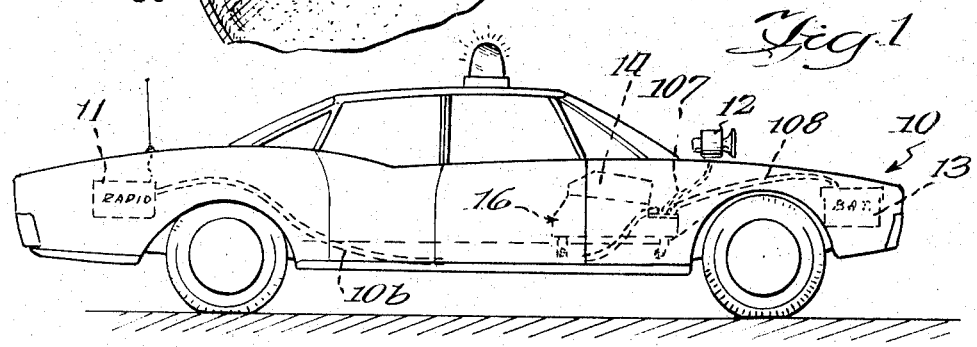
INVENTOR
William M. Hanley
BY Joseph J. Gras
ATTORNEY

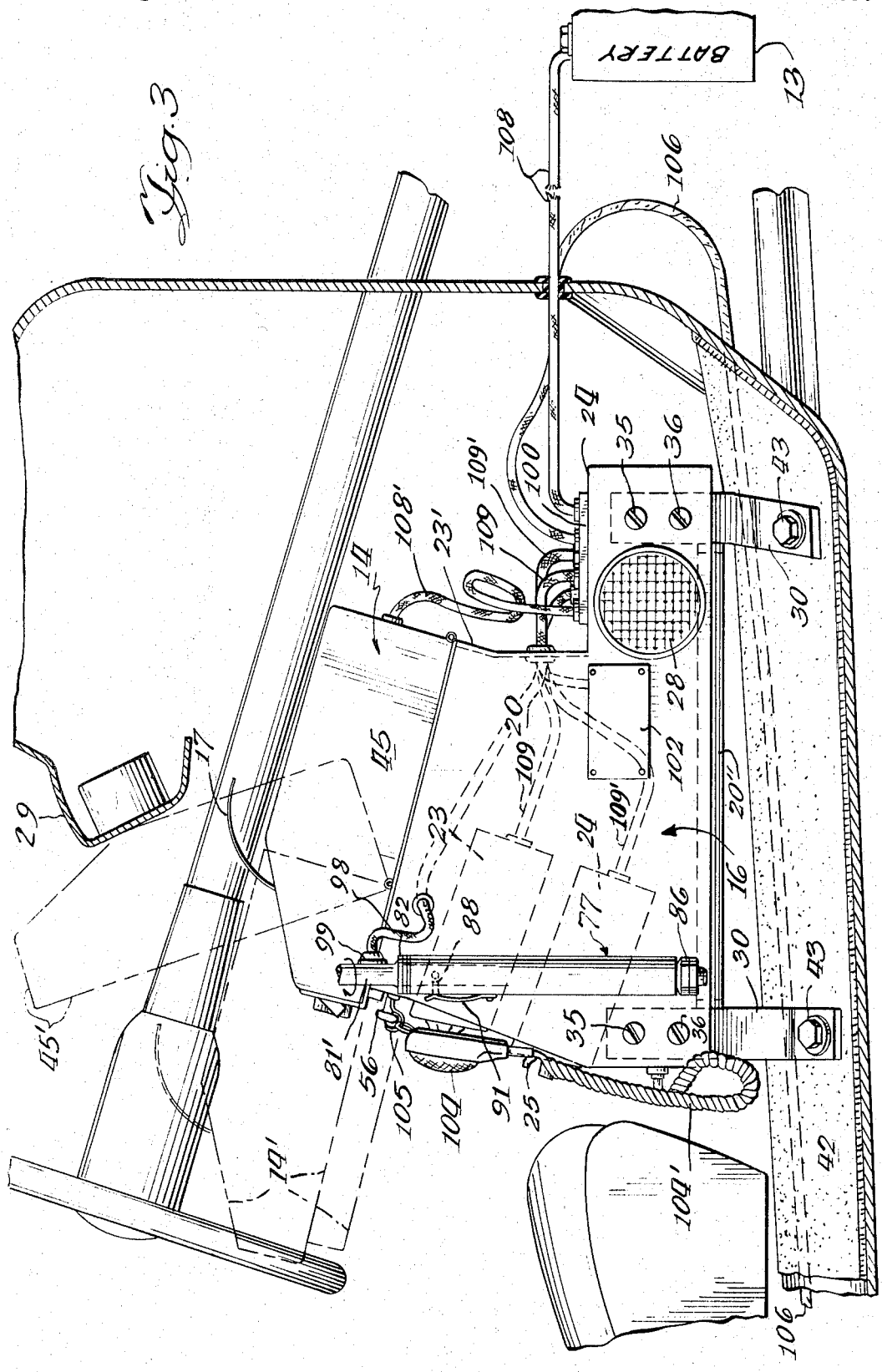

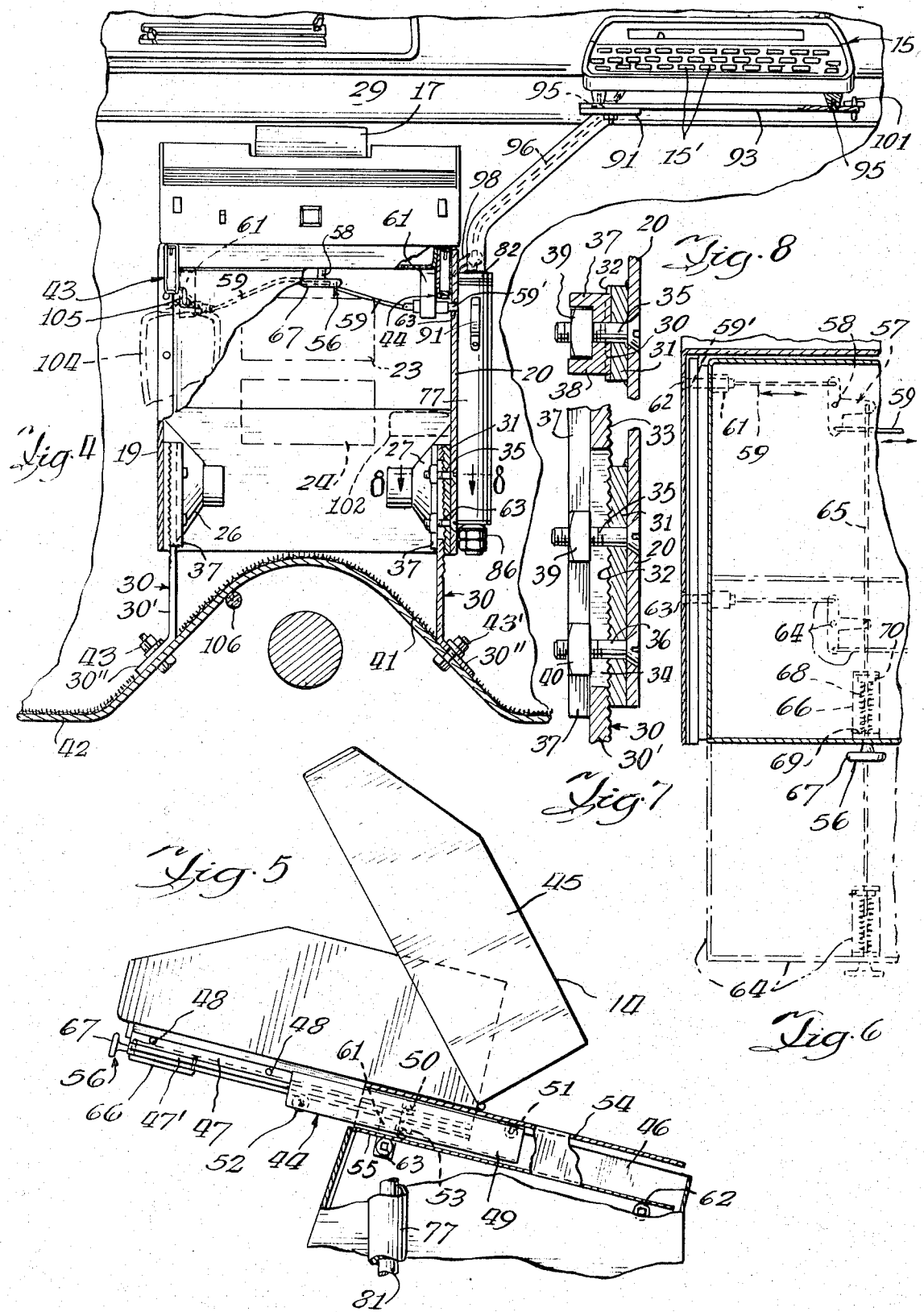

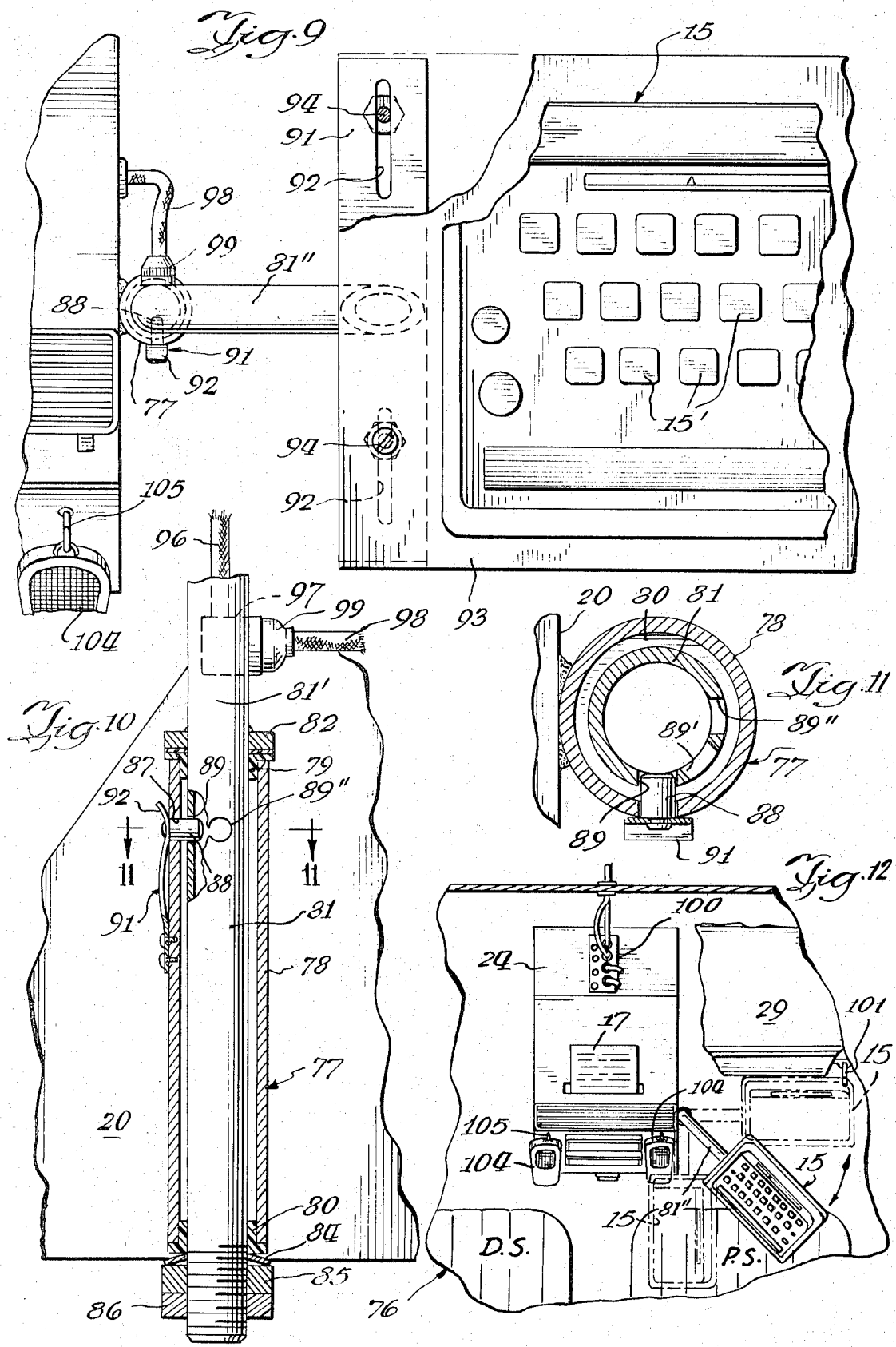

United States Patent Office 3,550,001
Patented Dec. 22, 1970

1

3,550,001
TELEPRINTER EQUIPMENT MOUNTING ASSEMBLY
William M. Hanley, Wilmette, Ill., assignor to SCM Corporation, New York, N.Y., a corporation of New York
Filed Aug. 1, 1968, Ser. No. 749,552
Int. Cl. B06r 7/00; H04b 1/00, 1/06
U.S. Cl. 325—15
18 Claims

ABSTRACT OF THE DISCLOSURE

There is disclosed an automobile with radio receiving and transmitting equipment, siren equipment, a mounting assembly secured to the "hump" of the floor under the instrument panel of the automobile, and teleprinter equipment including a keyboard transmitter and a teleprinter mounted by the mounting assembly, there being various controls mounted in said mounting assembly. The mounting assembly provides a center for mounting the teleprinter equipment and electrical connections for the radio, siren, and teleprinter equipments.

BACKGROUND OF THE INVENTION

*Field of the invention*

This invention relates to the art of mounting assemblies for teleprinter equipment.

*Description of the prior art*

Various types of cabinets and tables for mounting teleprinter equipment are known in the prior art. Such cabinets and tables are primarily designed for office use at relatively permanent locations. Teleprinter equipment has also been used in aircraft, trucks, and ships where in the main it has been mounted in a manner substantially similar to the manner it is mounted in office installations.

SUMMARY OF THE INVENTION

The invention provides a novel arrangement of components in a motor vehicle. A mounting assembly is secured in place under the instrument panel of the vehicle. Teleprinter equipment including a teleprinter and/or a keyboard transmitter is mounted by the mounting assembly. Various controls are also mounted by the mounting assembly. Radio receiving and transmitting equipment and siren equipment disposed remotely from the mounting assembly are electrically connected respectively to the teleprinter equipment and to the siren control through the mounting assembly. The arrangement and location of the mounting assembly and teleprinter equipment enables operation of the keyboard transmitter and reading of the printed message both from the driver's seat and from the passenger's seat, and yet there is no interference with driver or passenger comfort, freedom of movement, visibility, and entry into or exit from the vehicle.

BRIEF DESCRIPTION OF THE DRAWINGS

FIG. 1 is a side elevational view of an automobile embodying the mounting assembly of the invention;

FIG. 2 is a fragmentary pictorial view of the inside of the automobile shown in FIG. 1, showing in particular the mounting assembly, and a teleprinter and keyboard transmitter mounted thereby;

FIG. 3 is a vertical sectional view through the automobile showing the right side of the mounting assembly and the teleprinter;

FIG. 4 is a front elevational view, partly in section, showing the mounting assembly, and the teleprinter and keyboard transmitter mounted thereby;

2

FIG. 5 is a fragmentary side elevational view showing track structure by which the teleprinter is movably mounted;

FIG. 6 is a sectional view taken along line 6—6 of FIG. 4;

FIG. 7 is an enlarged sectional view of structure for locking one of the legs to the side panel of the locking assembly;

FIG. 8 is a sectional view taken along line 8—8 of FIG. 7;

FIG. 9 is a top plan view of a fragmentary portion of the mounting assembly and the keyboard transmitter showing in particular the adjustability of the platform with respect to a mounting bracket;

FIG. 10 is an enlarged sectional fragmentary view of structure for pivotally mounting the keyboard transmitter for movement between selected positions and for locking the keyboard transmitter in the selected position;

FIG. 11 is a sectional view taken along line 11—11 of FIG. 10; and

FIG. 12 is a top plan view of the teleprinter, keyboard transmitter and their mounting assembly showing the keyboard transmitter swung from a position in which it is operable from the passenger's seat to a position in which it is operable from the driver's seat.

DESCRIPTION OF THE PREFERRED EMBODIMENT

Referring to the drawings, there is shown in FIG. 1 a motor vehicle in the form of an automobile 10 having radio receiving and transmitting equipment 11 in its trunk, siren equipment 12 located on its fender, and a battery 13 under its hood.

With reference to FIGS. 2 and 3, teleprinter equipment which is shown to comprise a teleprinter 14 and a keyboard transmitter 15 mounted by a mounting assembly generally indicated at 16. The teleprinter 14 prints out a message on record medium 17 which is drawn from a roll (not shown) within the teleprinter housing. The printed message corresponds to the message received by the receiving portion of the radio equipment 11. A message generated by the keyboard transmitter 15 can be transmitted via the transmitting portion of the radio equipment 11.

The mounting assembly 16 has side panels 19 and 20, front panels 21 and 22, a rear panel 23', and a rear top panel 24. The panels 21, 22, 23' and 24 are rigidly interconnected. Each panel 19 and 20 can be suitably reinforced or strengthened by a rib 20". The panels 19, 20, 22, 23' and 24 are shown to be composed of sheet metal, but they can be formed of any suitable material such as wood, fiberglass, composition, or the like. The front panel 22 is secured to flanges 19' and 20' of the respective side panels 19 and 20. The front panel 22 mounts a siren control 23 and a radio control or control head 24. The front panel 22 also mounts various switches, control knobs 25 and the like. The front panel 22 can have suitable areas blanked-out to provide cutouts to receive controls 23 and 24 and switches and knobs 25 different from those illustrated; such controls can vary as to dimensions, depending on the manufacturer and hence only the blanking-out of the front panel is required to be changed.

The side panel 19 and 20 mount loud speakers 26 and 27 respectively, each being provided with a protective metallic grill 28.

The mounting assembly 16 is secured in place under the instrument panel 29 by four individual brackets 30. Two brackets 30 are secured to the side panel 19 and two brackets 30 are secured to the side panel 20. In FIG. 3, the two brackets 30 which are secured to the panel 19 are hidden behind the two brackets 30 which are shown in that figure.

Each bracket 30 is adjustably secured to its respective side member by structure best shown in FIGS. 4, 7 and 8 so that the mounting assembly of the invention can be readily accommodated to different makes and models of motor vehicles. A plate 31 having a serrated face 32 is suitably secured as by welding to the side panel 20. The bracket 30 has a serrated face 33 which meshes with the face 32. The bracket 30 has an elongated slot 34 through which bolts 35 and 36 pass. Bent-over portions 37 and 38 hold nuts 39 and 40 captive against rotation as best shown in FIG. 8. Each bracket 30 has a downwardly extending section 30' and a downwardly and outwardly extending section 30''. The section 30'' of each bracket 30 is clamped to the sloping surface of the "hump" 41 of the floor 42 of the motor vehicle by a threaded fastener 43'. With the height of the mounting assembly adjusted, bolts 35 and 36 associated with each bracket are tightened. It is apparent that because nuts 39 and 40 are captive, the bolts 35 and 36 can be tightened entirely from outside the mounting assembly 16.

Conventional track structure 43 and 44 mounts the teleprinter 14 for movement between the position shown in solid lines and the position shown in phantom lines 14' in FIG. 3; in that phantom line position, the teleprinter dust cover 45 can be moved to the position indicated by phantom lines 45' so that a new supply of paper or other record medium can be installed. The track structure 43 is like the track structure 44 shown in detail in FIG. 5. The track structure 44 has a fixed channel 46 secured to the side panel 20, a section 47 secured by machine screws 48 to the housing of the teleprinter 14, and a movable section 49 interconnecting the sections 46 and 47 by rollers 50, 51, 52 and 53. The section 47 has a guide flange 47'. Roller 50 is rotatably mounted to the section 49 and makes rolling contact with the upper side of the flange 47', and rollers 52 and 53 make rolling contact with the lower side of the flange 47'. Roller 51 makes rolling contact with the lower surface of upper flange 54 of the section 46 and roller 53 makes rolling contact with the upper surface of lower flange 55.

A locking device generally indicated at 56 is mounted to the underside of the housing of the teleprinter 14. The locking device includes a double bell crank 57 mounted on a depending pivot 58. Rods 59 connected to the double bell crank 57 are connected to respective slide bolts 59' which are slidably received in blocks 61 secured to the housing of the teleprinter 14. Opposed apertures 62 in the side panels 19 and 20 receive the slide bolts 59' when the teleprinter 14 is in its retracted position under the instrument panel as shown by solid and broken lines in FIG. 8, and opposed apertures 63 in the side panels 19 and 20 receive the slide bolts 59' when the teleprinter 14 is in its forward position as indicated by phantom lines 64. Intermediate apertures (not shown) between the apertures 62 and 63 can be provided, if desired. A rod 65 connected to the bell crank 57 is slidably received in a bracket 66 secured to the underside of the teleprinter 14. The end of the rod 65 has a knob 67. A spring 68 received by the rod 65 abuts an abutment face 69 of the bracket 66 and a lug 70 secured to the rod 65. When the knob 67 is pulled out, the slide bolts 59' withdraw from the apertures 62 or 63, and when the knob 67 is released the slide bolts 59' are spring urged into apertures 62 or 63 whichever are presented in the paths of the ends of slide bolts 59'.

With reference to FIG. 12, it is apparent that the keyboard transmitter 15 is movable between: a position shown in phantom lines immediately in front of the instrument panel 29 so that the keys 15' of the transmitter 15 are operable by a person seated in the passenger's seat P.S.; and a second position shown by solid lines, and a third position shown by phantom lines so that the keys 15' of the transmitter 15 are operable by a person seated in the driver's seat D.S. The seats D.S. and P.S. form part of seat structure generally indicated at 76. The seat structure 76 is anchored to the floor 42.

A mounting device generally indicated at 77 mounts the keyboard transmitter 15 for pivotal movement in a horizontal plane. The mounting device is shown to include a vertical tubular member 78 welded to the panel 20. The member 78 has bushings 79 and 80. A tubular member 81 extending through the member 78 has an integral collar 82. A ring 83 of good bearing material such as nylon is positioned between the collar 82 and the bushing 79. A spring 84 abuts against the bushing 80 and a nut 85. A lock nut 86 bears against the nut 85. The member 78 has an aperture 87 through which a pin 88 extends. The pin 88 is shown to extend through an aperture 89. Apertures 89' and 89'' are also provided. A leaf spring 91 mounts the pin 88 to the exterior of the member 78. By pulling on the extension 92 of the leaf spring, which serves as a handle, the pin 88 is withdrawn and the member 81 can be rotated to the position in which the pin is aligned with, and can enter, the aperture 89' or 89''. With the pin 88 in the aperture 89 as shown in FIGS. 10 and 11 the keyboard transmitter 15 is held locked in one of the phantom line positions in FIG. 12; when the pin 88 is in the aperture 89', the keyboard transmitter is held locked in the position shown by solid lines 75.

The member 81 has a vertically extending portion 81' joined to portion 81'' which extends in a transverse direction in the automobile. The portion 81'' is joined as by welding to a plate 91. The plate 91 has two elongated slots 92. A shelf or platform 93 is bolted to the plate 91, bolts 94 passing through the platform 93 and the slots 92 in the plate 91. The keyboard transmitter 15 is secured to the platform 93 by machine screws 95 (FIG. 4). A bundle of conductors 96, electrically connected to the transmitter 15, extend through the member 81 and are connected to a receptacle 97 (FIG. 10). Conductors 98 connected to a plug-in type connector 99 extend through the side wall 20 and are connected to the terminals of the plug-in type terminal board 100. The conductors 98 are flexible and long enough so that the member 81 can be pivoted. A locking device 101 can be provided to lock the platform to the instrument panel 29. A control 102 for the teleprinter 14 can be secured in a cutout in the side panel 20 and can be secured to the side panel 20 by screws. Microphones 104 can be hung on hooks on the front panel 22.

The radio receiving and transmitting equipment 11 is connected to the terminal board 100 by a bundle of conductors 106, siren equipment 12 is connected to the terminal board 100 by a bundle of conductors 107, and the battery 13 is connected to the terminal board by a cable 108. A bundle of conductors 108' which are flexible and long enough to permit the printer 14 to move to the position above by phantom lines 14' connects the teleprinter 14 and the terminal board 100.

The coil conductor 104' as well as the switches and controls 50 and 51 are likewise connected to the terminal board 100.

The receiving portion of the radio equipment 11 is electrically connected to the teleprinter 14 via some of the conductors 106, the terminal board 100, the control 102, and conductors 108'. The keyboard transmitter 15 is connected to the transmitting portion of the radio equipment 11 via conductors 96, 98, the terminal board 100 and some of conductors 106. Siren equipment 12 is connected to the siren control 23 via conductors 107, the terminal board 100, and conductors 109. Radio control 24 is connected to the radio equipment 11 via conductors 109', the terminal board 100, and some of the conductors 106. The terminal board 100 is wired so that the proper interconnections are made and that power is supplied from the battery 13 or other suitable source of electrical energy.

Other embodiments and modifications of this invention will suggest themselves to those skilled in the art, and all such of these as come within the spirit of this invention are included within its scope as best defined by the appended claims.

I claim:

1. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, and control means mounted by said mounting assembly and operable by a person seated on said seat structure.

2. In a motor vehicle having a floor, seat structure mounted on said floor and an instrument panel disposed upwardly from said floor and forwardly of said seat structure, a mounting assembly, means for securing said mounting assembly to said vehicle, a radio controlled teleprinter mounted by said mounting assembly, said teleprinter effecting printing on a record medium which is visible by a person seated on said seat structure, and control means mounted by said mounting assembly and operable by a person seated on said seat structure, said control means including a siren control and a radio control, a loud speaker, terminals, said siren control and said radio control being mounted by said mounting assembly, siren and radio equipment carried by said vehicle and disposed remotely from said mounting assembly, means electrically connecting said radio equipment to said teleprinter, said loud speaker and said radio control through predetermined ones of said terminals, and means electrically connecting said siren control and said siren equipment through predetermined other ones of said terminals.

3. The invention as defined in claim 2, wherein said means for securing said mounting assembly to said automobile includes brackets to which said mounting assembly is adjustably secured, said brackets being secured to the hump of the floor of said vehicle.

4. In a motor vehicle having a floor, seat structure mounted on said floor, and an instrument panel disposed upwardly from said floor and forwardly of said seat structure, a mounting assembly disposed under said instrument panel, means for securing said mounting assembly to said vehicle, radio transmitting and receiving equipment carried by said vehicle and disposed remotely from said mounting assembly, keyboard transmitter for generating electrical signals mounted by said mounting assembly, a radio-controlled teleprinter mounted under said instrument panel by said mounting assembly, and means electrically connecting said keyboard transmitter and said teleprinter to said radio transmitting and receiving equipment.

5. The invention as defined in claim 4, means for mounting said teleprinter for movement out from under said instrument panel to an outward position.

6. The invention as defined in claim 4, said seat structure having a driver's seat and a passenger's seat opposite said driver's seat, means mounting said keyboard transmitter for movement between a first position in front of and facing said passenger's seat and a second position facing said driver's seat so that either a person in the passenger's seat or a person in the driver's seat can operate said keyboard transmitter, and means for locking said keyboard transmitter in either said first position or in said second position.

7. The invention as defined in claim 4, said seat structure having a driver's seat and a passenger's seat opposite said driver's seat, and means mounting said keyboard transmitter for movement between a first position in front of and facing said passenger's seat and a second position facing said driver's seat so that either a person in the passenger's seat or a person in the driver's seat can operate said keyboard transmitter.

8. In a motor vehicle having a floor, seat structure mounted on said floor and an instrument panel disposed upwardly from said floor and forwardly of said seat structure, a mounting assembly having support means overlying portions of said vehicle floor and said vehicle seat structure, means for securing said mounting assembly to said vehicle floor, teleprinter equipment mounted by said support means, and control means mounted by said mounting assembly and operable by a person seated on said seat structure.

9. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, and track structure secured to said mounting assembly and to said teleprinter enabling movement of said teleprinter between its position under said instrument panel and a position out from under said instrument panel.

10. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, and means mounting said teleprinter for movement between its position under said instrument panel and a position out from under said instrument panel.

11. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, means mounting said teleprinter for movement between its position under said instrument panel and a position out from under said instrument panel, and means for locking said teleprinter in either of said positions.

12. In a motor vehicle having a floor, seat structure mounted on said floor and an instrument panel disposed upwardly from said floor and forwardly of said seat structure, a mounting assembly, means for securing said mounting assembly to said vehicle floor, a radio controlled teleprinter mounted by said mounting assembly, said teleprinter effecting printing on a record medium which is visible by a person seated on said seat structure, control means mounted by said mounting assembly and operable by a person seated on said seat structure, a keyboard transmitter disposed between said seat structure and said instrument panel, and means mounting said keyboard transmitter to said mounting assembly.

13. In a motor vehicle having a floor, seat structure mounted on said floor and an instrument panel disposed upwardly from said floor and forwardly of said seat structure, a mounting assembly, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, a keyboard transmitter disposed between said seat structure and said instrument panel, said seat structure having a driver's seat and a passenger's seat opposite said driver's seat, and means mounting said keyboard transmitter for movement between a first position in front of and facing said passenger's seat and a second position facing said driver's seat so that either a person in the passenger's seat or a person in the driver's seat can operate said keyboard transmitter.

14. In a motor vehicle having a floor, seat structure mounted on said floor and an instrument panel, a mounting assembly, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, a keyboard transmitter disposed between said seat structure and said instrument panel, said seat structure having a driver's seat and a passenger's seat opposite said driver's seat, means mounting said keyboard transmitter for movement between a first position in front of and facing said passenger's seat and a second position facing said driver's seat so that either a person in the passenger's seat or a person in the driver's seat can operate said keyboard transmitter, said keyboard transmitter mounting means including a platform to which said keyboard transmitter is secured, an upwardly extending mounting member pivotally secured to said mounting assembly, and means adjustably securing said platform to said mounting member.

15. In a motor vehicle having a floor, seat structure mounted on said floor and an instrument panel disposed upwardly from said floor and forwardly of said seat structure, a mounting assembly, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, said mounting assembly is disposed along the longitudinal center of said vehicle, a keyboard transmitter disposed between said seat structure and said instrument panel, means mounting said keyboard transmitter to said mounting assembly, said keyboard transmitter mounting means including a platform to which said keyboard transmitter is secured, and a mounting member secured to said mounting assembly and to said platform.

16. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, and control means mounted by said mounting assembly and operable by a person seated on said seat structure, said vehicle has radio equipment mounted remotely from said mounting assembly, a terminal board secured to said mounting assembly, and electrical conductors connecting said radio equipment and said teleprinter through said terminal board.

17. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, control means mounted by said mounting assembly and operable by a person seated on said seat structure, and a keyboard transmitter mounted by said mounting assembly.

18. In a motor vehicle having a floor, seat structure mounted on said floor and an instrument panel disposed upwardly from said floor and forwardly of said seat structure, a mounting assembly disposed under said instrument panel, means for securing said mounting assembly to said vehicle, a radio controlled teleprinter mounted by said mounting assembly, said teleprinter effecting printing on a record medium which is visible by a person seated on said seat structure, and control means mounted by said mounting assembly and operable by a person seated on said seat structure, said mounting assembly having side panels connected to each other by laterally extending panels including a front panel, said front panel having cutouts for receiving controls, said teleprinter being mounted to the upper ends of said side panels.

References Cited

UNITED STATES PATENTS

| | | | |
|---|---|---|---|
| 2,008,389 | 7/1935 | Finch | 325—66 |
| 2,599,904 | 6/1952 | Evans | 325—66X |
| 2,672,503 | 3/1954 | Hallden et al. | 178—6.6 |
| 3,059,184 | 10/1962 | Germain | 325—312X |
| 3,176,268 | 3/1965 | Meyer | 340—75X |
| 3,262,096 | 7/1966 | Nunn | 340—75 |
| 3,340,354 | 9/1967 | Lodenkamp | 178—4 |

FOREIGN PATENTS

| | | | |
|---|---|---|---|
| 1,384,770 | 11/1964 | France | 325—312 |

ROBERT L. RICHARDSON, Primary Examiner

H. W. BRITTON, Assistant Examiner

U.S. Cl. X.R.

224—42.44; 296—1; 325—66, 117, 312; 340—135